Feb. 26, 1963    M. J. RYMLAND    3,078,480
SPRING ASSEMBLY AND METHOD OF MANUFACTURE
Filed Dec. 29, 1958    3 Sheets-Sheet 1

INVENTOR
MURRAY J. RYMLAND

BY Cushman, Darby & Cushman
ATTORNEYS

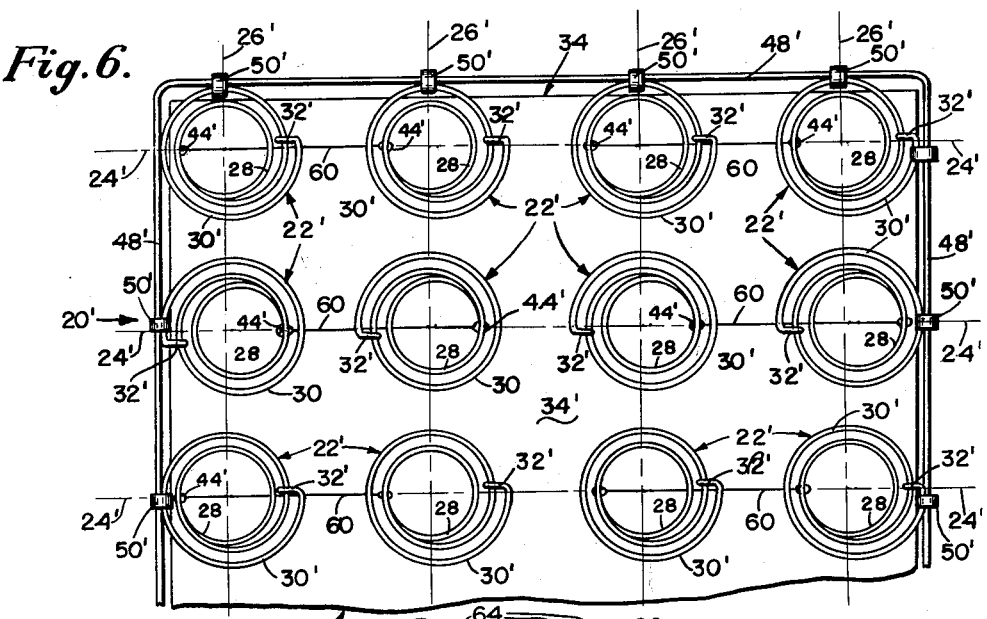
Fig. 6.
Fig. 9.
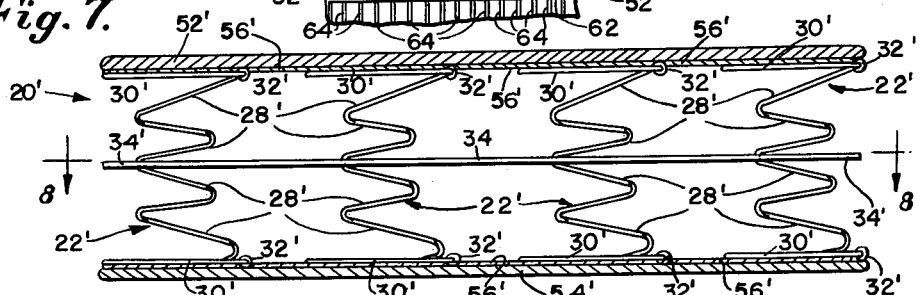
Fig. 7.
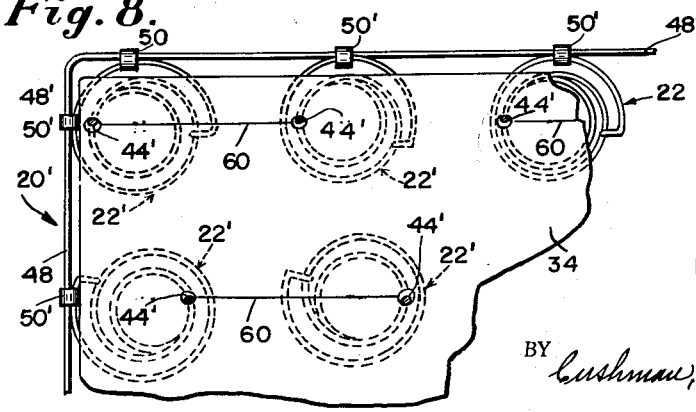
Fig. 8.
INVENTOR
MURRAY J. RYMLAND
BY Cushman, Darby & Cushman
ATTORNEYS Feb. 26, 1963 M. J. RYMLAND 3,078,480
SPRING ASSEMBLY AND METHOD OF MANUFACTURE
Filed Dec. 29, 1958 3 Sheets-Sheet 3

INVENTOR
MURRAY J. RYMLAND
BY *Cushman, Darby & Cushman*
ATTORNEYS

United States Patent Office 3,078,480
Patented Feb. 26, 1963

3,078,480
SPRING ASSEMBLY AND METHOD OF
MANUFACTURE
Murray J. Rymland, Fairmont Ave., and Bethel St.,
Baltimore 31, Md.
Filed Dec. 29, 1958, Ser. No. 783,298
11 Claims. (Cl. 5—252)

This application is a continuation-in-part of my copending application Serial No. 747,685, and now abandoned.

This invention relates to coil spring assemblies, spring mattresses or spring cushions, and more specifically to structures and methods involved in their manufacture.

Spring assemblies utilizing coil springs are typically constructed so that the individual springs are connected together in the desired spaced relation by means of special structures engaging the top and bottom coils or convolutions of the springs. In some cases, these special structures may require time consuming operations adding considerably to the cost of the final product.

It has been proposed heretofore to connect the component springs together by using parallel and spaced boards engaged to intermediate convolutions of the springs, the boards requiring a border frame to hold them in place to determine the spacing of the lines of springs in the direction perpendicular to the boards. In these proposed constructions, it is necessary that each of the springs be separately attached to its respective board by some special procedure of additional structure, complicating the manufacturing operation. Furthermore, it is usually still necessary to utilize additional means, such as cord or twine, tied to the springs to prevent undesirable movements thereof.

Accordingly, the main purpose of this invention is to provide novel structures, methods and techniques adapted to simplify and facilitate the manufacture of spring assemblies and to overcome disadvantages of the prior art, such as those alluded to herein.

A further purpose is to provide a novel structure conveniently and securely engageable to intermediate convolutions of coil springs. A related and more specific object resides in the provision of a novel arrangement of upper and lower covering sheets for the spring assembly in combination with the aforesaid intermediate structure.

A further object is to provide inexpensive and simplified means and methods for arranging coil springs in predetermined spaced relation, for example, in parallel longitudinal and transverse lines, i.e., rows and files, to produce a spring assembly of uniform characteristics throughout, and involving a minimum of time, machinery and structure.

In accordance with one embodiment of the invention, to be described in more detail hereafter, it is contemplated that the aforesaid intermediate structure be defined by a plurality of stiff, planar members arranged in coplanar relationship so that their edges are in pressure engagement with each other, with the wire-like elements in the coil springs passing through the seam or joint defined by adjacent and engaged edges of these members, the springs being securely held against movement by reason of the engagement of the wire-like elements to such edges.

According to another embodiment, to be later described in detail, it is contemplated that the aforesaid intermediate structure be defined by a stiff and planar member of solid, integral construction and provided with openings therein in a predetermined arrangement for reception of the wire-like elements in the coil springs and of such size and shape in relation to the thickness of these wire-like elements that said elements will be effectively frictionally locked in such openings wherefore undesirable lateral movements of the springs will be prevented. The method of assembling the springs in these openings involves initial insertion of an end of the spring into the opening and then turning or screwing the helical spring through the opening the desired distance.

A more specific contemplation relates to the use of upper and lower covering sheets having an adhesive or tacky substance thereon engaging the top and bottom end convolutions of the coil springs to coact with the intermediate structure in further preventing undesirable movements or changes in the positions of the springs.

Further objects and advantages of the invention will be in part obvious and in part pointed out hereinafter.

The novel features of the invention may be best made clear from the following description and accompanying drawings in which:

FIGURE 6 is a fragmentary plan view of a spring assembly constructed in accordance with another embodiment of the invention;

FIGURE 7 is a side elevational view of the spring assembly of FIGURE 6 and looking in the direction of bottom to top in that figure and showing top and bottom covering sheets for the spring assembly;

FIGURE 8 is a fragmentary sectional view taken generally along the line 8—8 of FIGURE 7;

FIGURE 9 is a bottom plan view of an alternative form of the top covering sheet of FIGURE 7 and on a reduced scale;

Figure 14:
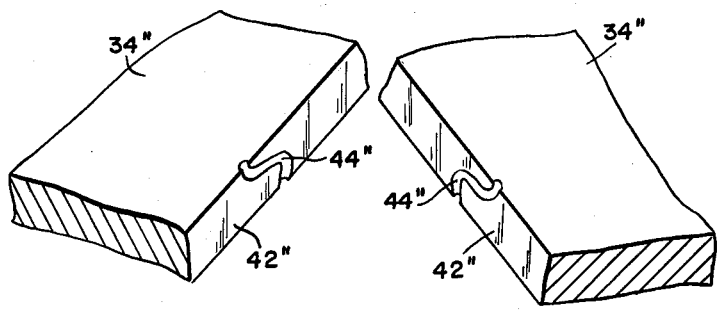
Figure 15:
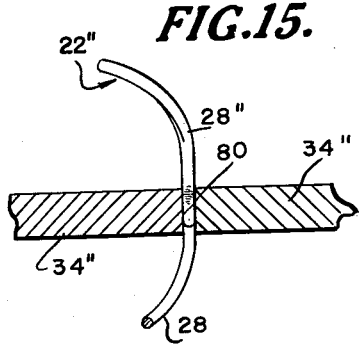

FIGURE 14 is a perspective view of adjacent planar members shown in a partially opened position and illustrating an exemplary shape of grooves formed therein and engaging complementarily shaped portions of the wire-like elements in the springs; and FIGURE 15 is a generally vertical sectional view taken generally along a line running through the mating grooves between adjacent and engaged planar members, and with the engaged coil spring shown fragmentarily and not in section.

Referring now to FIGURES 1-5, a spring assembly 20 is shown as including a plurality of individual coil springs 22 arranged in parallel longitudinal and transverse lines, i.e., rows 24 and files 26. The springs 22 are shown as being of the hourglass or double volute type having intermediate convolutions 28 and top and bottom end convolutions 30. As shown, these end convolutions 30 terminate in ends 32 tied or wound around the adjacent convolution. However, it will be appreciated from the following description that these ends 32 may be free and unconnected to any other portion of the spring; and further, the springs 22 may be of other configuration, such as cylindrical or conical, if desired.

Figure 1:
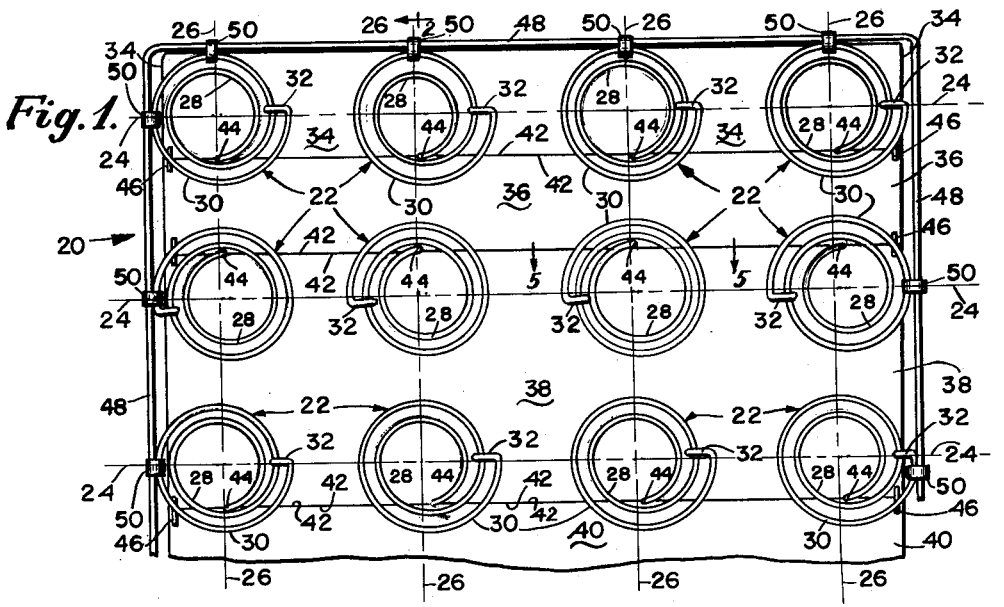
FIGURE 1 is a fragmentary plan view of a spring assembly constructed in accordance with one embodiment of the invention.
Figure 2:
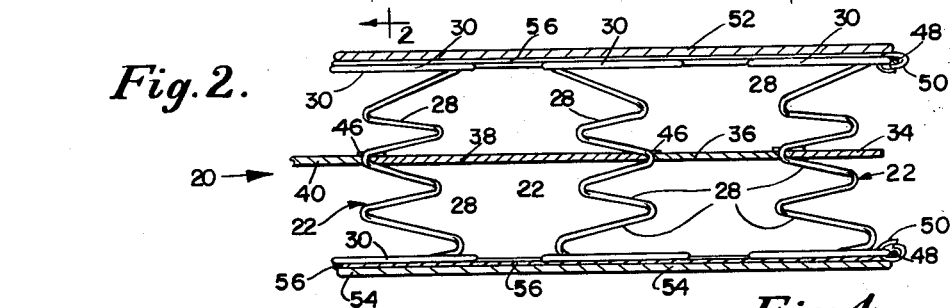
FIGURE 2 is a sectional view taken generally along line 2—2 of FIGURE 1 and showing top and bottom covering sheets for the assembly.
Figure 4:
FIGURE 4 is an elevational view showing an exemplary manner of connecting the planar members in the spring assembly of FIGURE 1.
Figure 5:
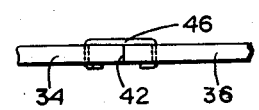
FIGURE 5 is an enlarged elevational view taken generally along the line 5—5 of FIGURE 1.
Figure 3:
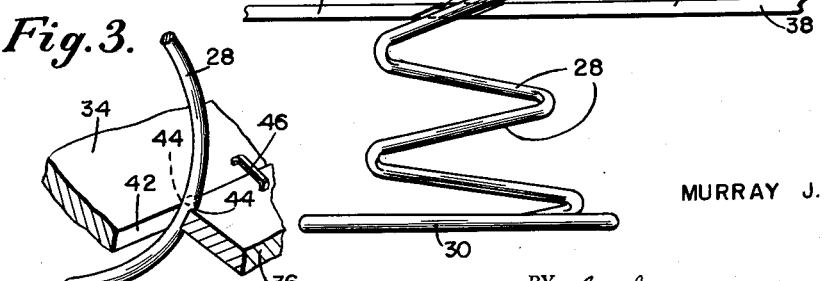
FIGURE 3 is an enlarged fragmentary perspective view of a portion of the spring assembly of FIGURE 1.

In arranging the springs in the rows 24 and files 26, it is contemplated in the embodiment of FIGURES 1–5 that a plurality of stiff planar members 34, 36, 38, 40 be utilized for engagement to intermediate convolutions 28 of the springs and be arranged substantially in a common plane. Each of these planar members is shown to be of rectangular configuration with their adjacent edges 42 in engagement with each other to define a solid structure intermediate the top and bottom end coils 30 of the springs, and coextensive with the spring assembly 20. As best seen in FIGURES 3 and 5, mating and opposed grooves 44 are formed in the engaged edges 42 of these members with the springs passing therethrough. These grooves preferably define an opening of substantially the same size as the wire-like element in the springs, and may be formed in only one of the engaged edges 42 for each two adjacent members 34, 36, 38, 40. Further, these members may be held together by any appropriate fastening means, such as staple-like elements 46 arranged, for example, at the outer ends of the members, as shown.

An exemplary method of constructing the spring assembly 20 will now be described. It involves initially arranging the member 34 in a generally horizontal position above a flat working surface (not shown), after which the desired number of springs 22 will be placed so that corresponding intermediate convolutions 28 thereof will be in engagement with the edge 42 of this member, as indicated in FIGURES 1 and 2.

The member 36 is then brought up on the same level as member 34 and moved into a position wherein its edge 42 is in full contact with the adjacent edge 42 of member 34, with the members being coplanar.

If the members 34, 36 are initially provided with grooves 44 either along one or both of the engaged edges thereof, the springs 22 will be arranged so as to pass through such grooves to give the desired spring spacing.

However, the grooves 44 may be formed in the edges 42 during the step of bringing or forcing the edges of the planar members together. This step of forcing the member 34 against the member 36 so that their edges are pressed into contact with each other to form the grooves 44 may be effected by hand or some suitable tools and the stiff members 34, 36 will then have to be constructed of some deformable material so that when the members 34, 36 are so brought together under pressure the intermediate convolutions 28 of the springs will deform the edges 42 into the mating grooves 44.

As will be understood, the springs 22 conventionally are constructed from metallic wire, while the stiff members 34, 36, 38, 40, by way of example, may be constructed of cardboard, wood, plastic, or some other suitable material softer than the material in the wire-like elements of the springs 22 if it is desired that the grooves 44 be formed in the edges 42 by the springs 22, as described. Or, members 34, 36, 38, 40 may be made of harder and more rigid materials if the grooves 44 are preformed therein.

After the members 34, 36 have been arranged in the positions indicated by the aforedescribed method, the fasteners or staples 46 may be attached at their ends, as shown, and also at other points along the edges 42, if desired, to hold these members together. Thus, there will be defined the first row 24 of springs. At this time, another row of springs may be arranged with corresponding portions of their intermediate convolutions in engagement with the free edge 42 of member 36, as indicated in FIGURE 1, after which member 38 will be brought up and engaged to member 36 in the same manner as that described for connecting members 34 and 36. Thus a second row of springs is defined. It will be appreciated that the springs in this second row, although shown as being in alignment with the springs in the first row to define the files 26, may be arranged out of alignment or in staggered relation to the springs in the first row. Furthermore, the number of springs in these rows need not be the same but may vary from row to row.

The next row of springs will be similarly formed by placing intermediate convolutions of additional springs in engagement with the free edge of member 38 and bringing up and connecting the member 40 to the member 38 in a similar manner.

By such procedures, the desired number of rows of springs may be assembled between such planar members, with each row including any desired number and arrangement of springs, to define the spring assembly.

After the springs have been thusly arranged, a border wire 48 may be provided in encircling relation to the top and bottom of the spring assembly, as by engagement with clips 50 to the top and bottom end convolutions 30 of the springs in the border of peripheral regions of the spring assembly, as indicated in FIGURES 1 and 2. It will be understood that other border wire arrangements, such as that disclosed in my copending applications Serial Nos. 596,589 and 596,590, filed July 9, 1956, which latter is now Patent No. 2,993,215, issued July 25, 1961, may be utilized in lieu of the rectangular border wire 48 shown.

By reason of their engagement to the members 34, 36, 38, 40, the springs 22 will be effectively held against any lateral shifting movements without requiring any additional structure.

Upper 52 and lower 54 covering sheets are shown in FIGURE 2 as being placed over the top and bottom of the spring assembly. These sheets may be constructed of any desirable material, such as foam rubber or padded fiber, and a suitable tacky or adhesive material, such as latex or the like is indicated by reference numeral 56 as being applied to one face of the sheets 52, 54 for adhesion to the top and bottom end convolutions 30 of the springs. The adesive material 56 may be provided over the entire area of the sheets 52, 54, or it may be provided only in the area of the end convolutions 30 to be secured thereto.

It will be appreciated that the usual cover or upholstering (not shown) may then be applied to enclose the entire spring assembly in any known manner.

Referring now to the embodiment shown in FIGURES 6–8, wherein similar reference numerals have been used to designate similar parts, it will be seen that the intermediate structure for assembling the springs 22' in desired position in the spring assembly 20' comprises a stiff and integral member 34' preferably of a length and width, or area, substantially coextensive with the area of the spring assembly 20'. The member 34' may be constructed of the same material as the members 34, 36, 38, 40 previously described, and as shown, it includes a plurality of apertures or openings 44' provided therein in a predetermined arrangement along the rows 24'.

These openings 44' preferably are of a size slightly larger than the wire-like elements of the springs 22' to pass therethrough. The member 34' is also shown as being slitted as at 60 between alternate pairs of openings 44'. The spacing between adjacent openings 44' in each row is shown as being greater than the diameter of the end convolutions 30' of the springs. The member 34' preferably is somewhat elastic or resilient whereby the spring end convolutions 30' may be initially inserted through the slits 60 by vertically separating the portions of member 34' on either side of the slit to define a large enough opening therebetween for the end convolution. After the end convolution has been so inserted through the slit 60, the spring may then be moved laterally toward the desired opening 44' and turned or screwed so as to effect vertical movement of the spring through the opening 44' and into its desired position, for example, the position shown in FIGURES 6, 7 and 8.

All of the springs may be assembled into the member 34' in this same manner, as indicated in the drawing to define the rows 24' and files 26' constituting the spring assembly 20'. It will be appreciated that the arrangement and spacing of the openings 44' throughout member 34' predetermines the spacing and arrangement of the springs 22' in the spring assembly. As is evident, the arrangement and spacing of these openings 44' may be varied from that shown to vary the positioning of the springs in the spring assembly.

In the event that the ends 32' of the spring end convolutions 30' are not tied or looped around an adjacent portion of the spring, as shown, but are free ends, the springs may then be assembled into the member 34' by initially inserting such free ends into the openings 44' and turning or screwing the springs to cause them to be disposed in the desired position in these openings. In this case, it would not be necessary to utilize the slits 60 or to have the member 34' resilient or elastic.

After the springs have been assembled in the member 34', as described, the side walls of the openings 44' will prevent lateral movements of the springs by engagement to the intermediate spring convolutions passing therethrough.

The spring assembly 20' may then be completed by providing a border wire 48' therefor and covering sheets 52', 54' in the same manner as that described for the embodiment of FIGURES 1–5. It will be understood that, if desired, a border wire similar to the wire 48 may be provided around the connected members 34, 36, 38, 40 of FIGURE 1 or the member 34' of FIGURE 6 if additional strength is desired.

The top and bottom covering sheets for the spring assemblies 20, 20' may be attached thereto at any convenient or appropriate time during the assembling operation. For example, these sheets may be applied after all of the springs have been assembled in position in their intermediate structures 34, 36, 38, 40 or 34' or the sheets may be attached to each row of springs as such row is arranged in the assembly, or in any other desired manner.

If desired, a reticulated wire-like structure may be provided on the inner faces of the covering sheets 52, 54, or 52', 54' for securement to the springs. Such a structure is shown in FIGURE 9 as including interconnected longitudinal 62 and transverse 64 wires on the inner face of the sheet 52, the wires 62 being flexible whereby the structure may be deformed or curved along axes parallel to the wires 64. This reticulated structure may be coextensive with the assembly 20 or 20' and connected to the spring end convolutions and the sheet 52 by any appropriate means, as is understood. For example, wires (not shown) may be interlaced or woven between the spring end convolutions and the wires 62, 64 and these latter wires may be then attached to the sheet 52 by a tacky substance such as that referred to hereinabove.

It will be appreciated that the widths of the members 34, 36, 38, 40 may be varied from the dimension shown in FIGURE 1 whereby the spacing of the rows 24 can be varied. Likewise, although the lengths of these members are shown to be uniform and coextensive, there may be some variation from member to member, if desired.

Figure 10:
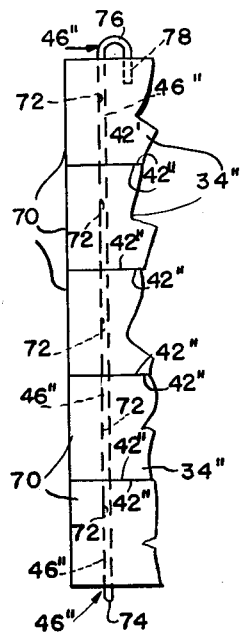
FIGURE 10 is a fragmentary plan view showing a modification of the means for connecting the planar members shown in FIGURE 4.
Figure 11:
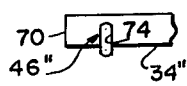
FIGURE 11 is a fragmentary elevational view of the bottom planar member shown in FIGURE 10.
Figure 12:
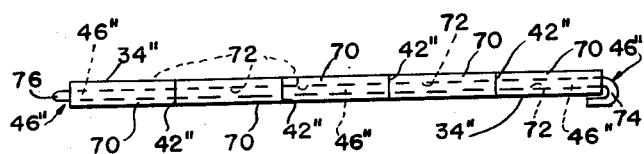
FIGURE 12 is an elevational view of the left hand end of the planar members shown in FIGURE 10.

FIGURES 10–12 illustrate an alternative arrangement for interconnecting the planar members shown in FIGURES 1–5. In this alternative arrangement, the planar members 34" corresponding to members 34, 36, 38, 40 of FIGURES 1–5 are shown as being interconnected by a slender element 46" disposed adjacent to and parallel with the end edges 70 of the members 34". Element 46" preferably extends through aligned, transverse holes 72 in the members 34, as indicated, and is formed of some suitable relatively stiff yet flexible material, such as metallic wire.

In arranging element 46" in position, the operator may insert same by hand successively through the holes 72 of the successive members 34", until it has passed through all of these members involved in making up the spring assembly. The leading end of element 46" will initially be straight and undeformed to facilitate insertion into the holes 72. Thereafter, this end may be bent or otherwise deformed, such as indicated by the reversely bent end portion 74 shown in FIGURE 12. The opposite end portion 76 may also be deformed, for example, by bending it in a generally horizontal plane and inserting the free end 78 thereof partially into the adjacent member 34", as indicated in FIGURE 10. It will be evident that these end portions 74, 76 may be bent or deformed into other appropriate shapes for the purpose of locking element 46" against accidental removal from the members 34".

As will be appreciated, an element similar to element 46" may be similarly arranged at the end edges of the members 34" opposite the end edges 70.

By virtue of the use of these elements 46" for interconnecting the planar members, greater flexibility and freedom for limited relative movements between the members 34" will be provided, thus improving the softness, comfort and resiliency of the spring assembly.

Figure 13:
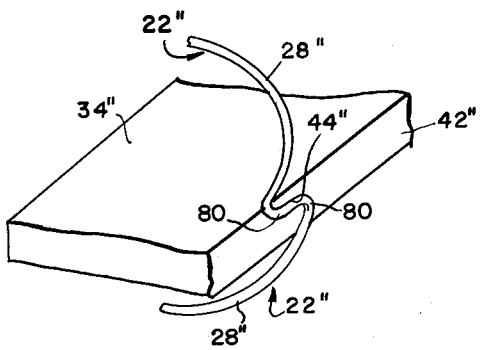
FIGURE 13 is a fragmentary perspective view corresponding somewhat to FIGURE 5, and showing a modified construction for lockingly engaging the spring to the planar members.

FIGURES 13–15 illustrate a modification of the structure illustrated in FIGURES 3 and 5 for retaining the springs in position in between the planar members. As shown, in FIGURES 13–15, the intermediate convolution 28" of the springs 22" is formed into a somewhat S-shaped or Z-shaped portion 80 adapted to be locked into mating and complementary grooves 44" in the side edges 42" of the members 34".

In assembling the springs 22" in between the members 34", the same general steps may be followed as those described above in connection with the FIGURES 1–5 embodiment, and the members 34" may be constructed of the same exemplary materials as those specified for members 34, 36, 38, 40, whereby as the initially plain and ungrooved edges 42" are firmly pressed into contact with the S or Z-shaped portion 80 of each spring, these portions 80 will cause the mating, complementary grooves 44" to be formed in the edges 42" (in a manner similar to that referred to above for forming grooves 44 in the members 34, 36, 38, 40) providing a more positive locking fit for the springs in the members 34".

Portions 80, is the illustrative embodiment, are formed approximately at the axial midpoint, or halfway between both ends of the spring. If desired, although not preferred, the grooves 44" may be preformed in the edges 42" for proper engagement to the portions 80 of the springs.

It should be evident that the engagement of portions 80 of the springs in their respective grooves 44" in members 34" will more effectively retain the springs in their proper positions in the spring assembly and prevent them from unscrewing or otherwise undesirably moving bodily relative to the members 34".

Although these portions 80 have been shown as being somewhat S-shaped or Z-shaped, it will be appreciated that other shapes will also be suitable.

The present invention will thus be seen to completely and effectively accomplish the objects enumerated hereinabove. It will be realized, however, that various changes and substitutions may be made to the specific embodiments disclosed herein for the purpose of illustrating the principles of this invention, without departing from these principles. Therefore, this invention includes all modifications encompassed within the spirit and scope of the following claims.

I claim:

1. A spring assembly including: a plurality of coil springs, each of said springs being constructed of wire-like elements; a stiff and planar substantially solid structure substantially coextensive with said spring assembly and disposed intermediate the upper and lower ends of said assembly; said structure being defined by a plurality of planar members having side edges and by means for holding said members together in assembled relation with said edges of said members being in engagement with each other, the wire-like elements of each of said springs passing through the seam defined by adjacent and engaged edges of said members and said elements being firmly held against lateral movement between and by said edges.

2. The assembly defined in clam 1 wherein mating grooves are formed in the engaged edges of said members, the wire-like element of each of said springs being disposed in said mating grooves.

3. A spring assembly including a plurality of coil springs, each of said springs being constructed of a wire-like element, means for connecting said springs together in substantial parallelism and in predetermined, spaced relation, said means including a plurality of stiff, flat members of generally rectangular outline arranged in a common plane with their edges in contact with each other to define a substantially solid structure disposed intermediate the upper and lower ends of said assembly and in substantially coextensive relation with said assembly, grooves being formed in the edges of said members, and the wire-like element of each of said springs being disposed in and passing through said grooves and said structure engaging between convolutions of said springs.

4. The assembly defined in claim 3 wherein upper and lower covering sheets are provided for said springs, said sheets having a coating on their inner surfaces adhered to the upper and lower ends of said springs.

5. The assembly defined in claim 1 wherein mutually engaged means are provided on the wire-like elements of said springs and on the edges of said members for locking said springs against any bodily movement relative to said members.

6. The assembly defined in claim 5 wherein said mutually engaged means comprises an undulating groove in the edge of each of said members and a complementarily shaped portion in said coil spring.

7. The assembly defined in claim 1 wherein said means for holding said members together includes an elongated flexible element engaged to said members along the end edges thereof.

8. The assembly defined in claim 7 wherein said elongated flexible element is arranged in aligned transverse holes in said members adjacent the end edges thereof.

9. The assembly defined in claim 3 wherein said grooves are of generally undulating outline, and further wherein those portions of the wire-like elements of said springs disposed in said grooves are complementary in shape to said grooves.

10. The assembly defined in claim 9 wherein means are provided for holding said flat members together, said means including an elongated wire-like element extending transversely through said members along the free end edges thereof.

11. A method of manufacturing spring assemblies including coil springs, each of said springs being constructed of a wire-like element, and a plurality of stiff, flat members, said method including the steps of: arranging intermediate convolutions of a plurality of coil springs in engagement with an edge of a first one of said members, arranging a second one of said members at substantially the same level as and adjacent to said first member with said plurality of springs being disposed therebetween and with said members extending between convolutions of said springs, bringing the adjacent edges of said first and second members into contact with each other, with the wire-like element of each of the springs being disposed between and in contact with such edges, and securing together said first and second members to hold said springs therebetween, said first and second members being constructed of a softer material than said springs and being brought together with such pressure that the wire-like element of each of the springs disposed therebetween effect mating impressions or grooves in the engaged edges of said first and second members.

References Cited in the file of this patent
UNITED STATES PATENTS

| | | |
|---|---|---|
| 135,989 | Holmes | Feb. 18, 1873 |
| 193,567 | Spencer | July 24, 1877 |
| 770,278 | Fletcher | Sept. 20, 1904 |
| 1,270,841 | Kelly | July 2, 1918 |
| 1,725,935 | Roeske | Aug. 27, 1929 |
| 1,972,397 | Foster | Sept. 4, 1934 |
| 2,425,935 | Hayman | Aug. 19, 1947 |
| 2,525,730 | Schulze | Oct. 10, 1950 |
| 2,529,268 | Tauss | Nov. 7, 1950 |

FOREIGN PATENTS

| | | |
|---|---|---|
| 5,668 | Great Britain | June 25, 1828 |